May 6, 1930.  B. CONWAY  1,757,415
MACHINE FOR CUTTING BRAKE LININGS
Filed March 22, 1928    2 Sheets-Sheet 1
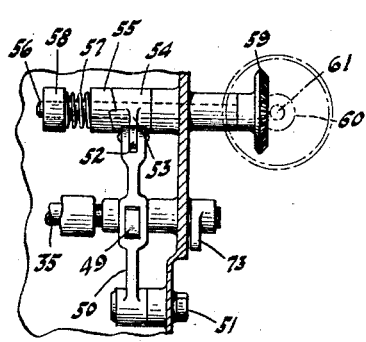
Fig. 3
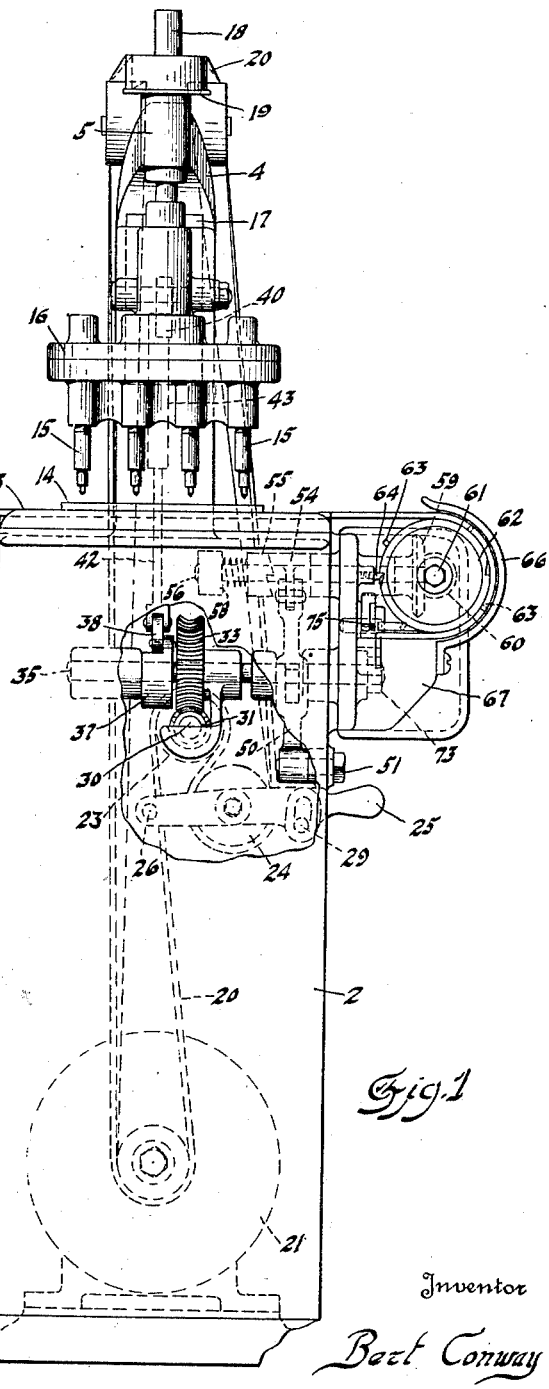
Fig. 4
Fig. 1
Inventor
Bert Conway
By Blackmore, Spencer & Flint
Attorneys

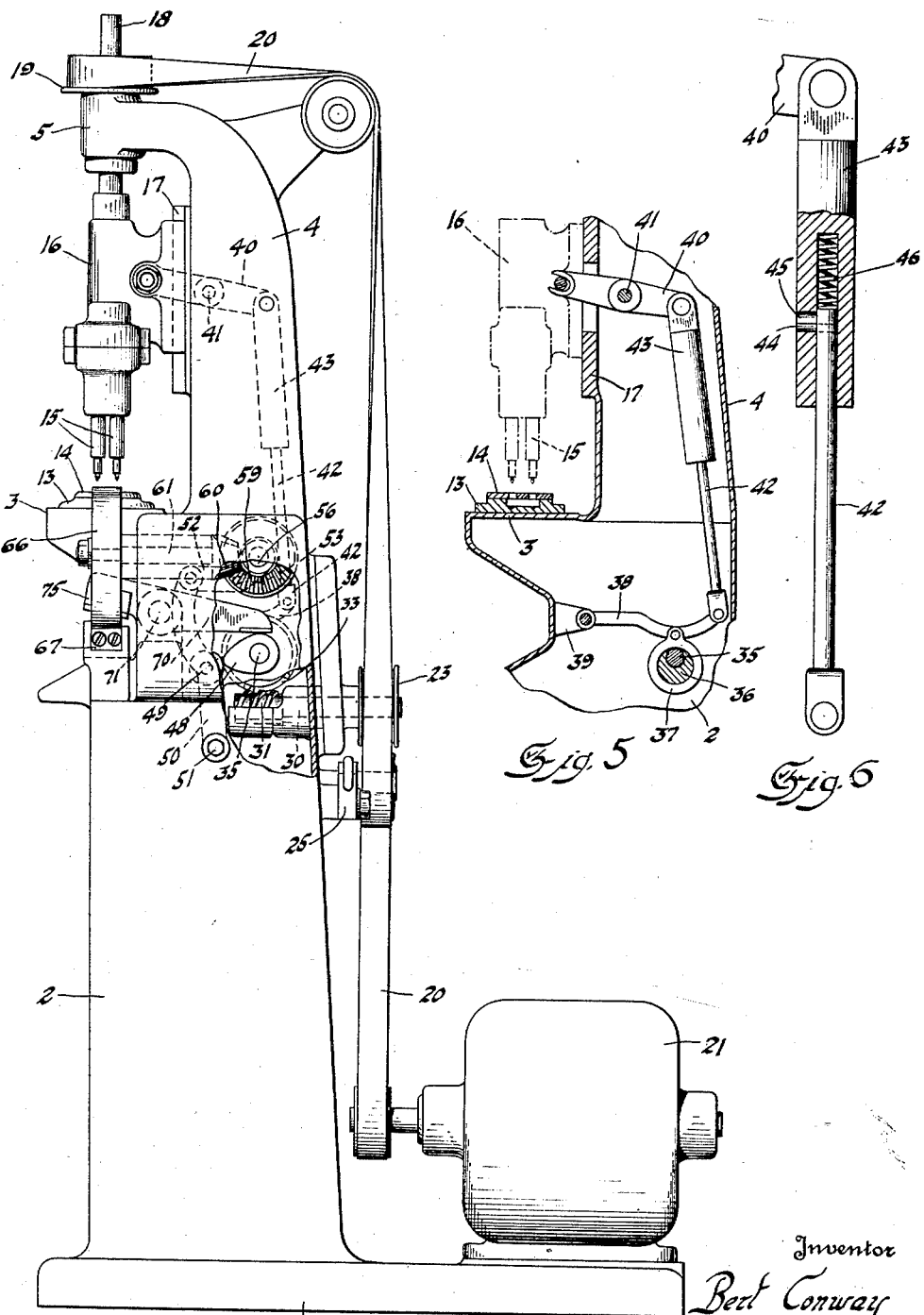

Patented May 6, 1930

1,757,415

UNITED STATES PATENT OFFICE

BERT CONWAY, OF DETROIT, MICHIGAN, ASSIGNOR TO GENERAL MOTORS CORPORATION, OF DETROIT, MICHIGAN, A CORPORATION OF DELAWARE

MACHINE FOR CUTTING BRAKE LININGS

Application filed March 22, 1928. Serial No. 263,724.

This invention relates to automatically operated machines and is particularly adapted for use in the automobile industry for the purpose of performing certain operations on brake lining. The automobile manufacturer generally purchases friction lining for brakes in drums or rolls of a given width. According to present practice certain lengths or strips are cut by hand from the rolls and then taken to a machine where an operator drills and countersinks a series of openings for the rivets which are to secure the lining strip on the brake shoe.

It is one of the objects of the present invention to provide an entirely automatic machine for feeding, driving and countersinking rivet openings and cutting the material to proper lengths, and in which the cycle of operations is continuous.

Other objects and advantages will be apparent from the following specification, taken in connection with the accompanying drawings, in which Figures 1 and 2 are a front elevation and a side elevation respectively, of the machine forming the subject matter of the present invention. Figure 3 is a detail sectional view of the feeding mechanism. Figure 4 is a fragmentary elevation showing the arrangement for cutting the material to length. Figure 5 is a vertical sectional view of an upper portion of the machine. Figure 6 is a detail view of one of the motion transmitting elements.

Referring to the accompanying drawings, the machine comprises a base portion 1, a pedestal 2 having a table 3, and an upwardly extending portion 4 having a terminal head 5. At one side of the pedestal are mounted a pair of spaced brackets or arms 6 upon which is supported a drum 7 carrying the roll of friction material to be operated upon. Loosely mounted on the shaft of the drum, is an arm 8, having a retracting spring 9 at one end, and which carries a spring pressed shoe 10 for engagement with the peripheral surface of an annular plate or disc 11 fixed on the shaft, whereby a slight frictional resistance is offered to the rotation of the drum, preventing unwinding of the rolled strip 12 faster than the feeding mechanism calls for. The strip 12 of the friction material passes over the table 3 through a fixture comprising a pair of plates 13 and 14, the plate 14 having openings for a series of boring tools or drills 15, carried by a spindle head 16 which bears against the plate or guide 17 on the upstanding portion 4. One or more drills 15 may be used depending upon particular requirements, eight being shown in drawing, and these tools act on that portion of the strip in the fixture to drill and countersink rivet holes. The several spindles are operated through suitable gear mechanism located in the spindle head and driven by an operating shaft 18 having a bearing in the head 5, and which has sliding keyed engagement in the pulley 19. The pulley is driven by a chain or belt 20 from the motor 21 mounted on the base of the machine, the belt also passing over the pulleys 23 and 24. The pulley 24 is carried on the lever 25 pivoted at 26 and having a slot through which a fastening bolt or pin 29 extends. The pin and slot arrangement permits adjustment of the lever to take up slack in the pulley.

The pulley 23 is mounted on a shaft 30 which carries a worm gear 31 meshing with the worm wheel 33 on the drive shaft 35 mounted in suitable bearings in the pedestal. Secured on the shaft 35 is an eccentric element 36 which rotates within a ring 37 secured on a lever 38 pivoted to the ear 39. The swinging motion of the lever 38 is transmitted to a rock lever 40 having a fixed pivot at 41 to reciprocate the spindle head 16, through the medium of a connecting rod or motion transmitting element which comprises a rod 42 extending into an opening in a member 43. The rod 42 carries a pin 44 which is slidable in a slot 45, and bears against a spring 46 which cushions the movement of the spindle head 16, and affords a certain degree of lost motion in the event the friction material offers a resistance to the drilling action of the boring tools. A cam 48 on the drive shaft 35 acts against a roller 49 on the lever 50 pivoted to the side of the pedestal on the pin 51, the upper end of the lever being connected by a link 52 with an ear 53 on the collar 54 forming a part of an overrunning or one way clutch. The collar 54 has a cam surface engageable with a similar surface on a collar 55 which is splined for axial sliding movement on a shaft 56, against the tension of spring 57 held by the collar 58. At the end of the shaft 56 is provided a bevel gear 59, which meshes with a gear 60 on a shaft 61 carrying a feeding drum 62, provided with a series of pins 63 for engagement within the openings or holes formed in the friction strip. The drum 62 is provided with a pair of slots spaced 180° apart into which is engageable a spring pressed pawl 64 to prevent reverse movement of the drum. It will be apparent that each rotation of the cam 48 imparts thru the lever and clutch, a half rotation to the drum, which feeds a length of the friction strip 12 across the table for the drilling operation and moves a length of drilled strip under the shield 66 and out the bottom on the shelf 67. A rock lever 70 pivoted at 71 is held by a spring 72 against the surface of the cam 73 on the end of the drive shaft 35, and carries a knife 75 which severs the strip of friction material into a predetermined length when the lever is rocked under the action of the cam. Thus the motor operates the several boring tools or drills carried by the spindle head and also rotates the drive shaft 35, which thru the series of cams and gears reciprocates the spindle head, intermittently rotates the feeding drum and rocks the knife lever, all in proper sequence or timed relation and thru repeating cycles, to automatically drill and countersink rivet openings and shear the friction lining strip to desired lengths.

I claim:

1. An automatially operated machine for forming brake lining strips, including a table over which passes the material to be operated upon, a reciprocatory spindle head carrying a tool for forming holes in the strip, an intermittently operated drum for feeding the material across the table, a movable knife for cutting the material to predetermined lengths, and a drive shaft having a series of cam elements which control the actuation of the several operating elements in timed relation with each other.

2. In an automatically operated machine for forming brake lining strips, a reciprocatory spindle head, a drive shaft having an eccentrically mounted bearing element, a motion transmitting element between said shaft and spindle head comprising two parts having a lost motion connection therebetween.

3. In an automatically operated machine for forming brake lining strips, a reciprocatory spindle head, a drive shaft having an eccentrically mounted bearing element, a motion transmitting element between said shaft and spindle head comprising a pair of relatively movable members, a spring interposed between said members to cushion relative movement in one direction, and means to limit the degree of relative movement between said members.

4. In an automatically operated machine for forming brake lining strips, a reciprocatory spindle head, a drive shaft having an eccentrically mounted bearing element, a motion transmitting element between said shaft and spindle head comprising a pair of members having a limited degree of relative movement, and a resilient element affording a cushion against such movement.

5. In an automatically operated machine for forming brake lining strips including in combination, a reciprocatory spindle head carrying a boring tool for forming an opening in the strip material, an intermittently operated feeding drum carrying peripheral pins for engagement within the openings formed in the strip material, a rock lever having a knife for shearing said strip material, a drive shaft, a series of cam elements on said shaft, motion transmitting means between one of the cam elements and said spindle head, mechanism operated by another of said cam elements including a one way clutch for moving said drum thru a partial rotation to feed a given length of strip material thru the machine, the third cam element being adapted to act on said rock lever, whereby the several parts operate in timed relation and thruout repeating cycles.

6. An automatically operated machine for forming brake lining strips, including a feeding device having a series of outwardly extending portions for projection into apertures in the strip to pull the strip across a work table, aperture forming means reciprocable to and from the table, and continuously operated means to intermittently actuate said feeding device for advancing a given length of the strip across the table and to reciprocate said means in certain predetermined relation and throughout continuously repeating cycles.

7. The structure of claim 6, together with a knife located beyond the feeding device and connected with said operating means for actuation at regular intervals to sever the strip into given lengths.

In testimony whereof I affix my signature.

BERT CONWAY.